United States Patent
Higashihara (10) Patent No.: US 10,452,198 B2
(45) Date of Patent: Oct. 22, 2019

(54) VEHICLE INPUT DEVICE

(71) Applicant: TOYOTA JIDOSHA KABUSHIKI KAISHA, Toyota-shi, Aichi-ken (JP)

(72) Inventor: Shota Higashihara, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/453,065

(22) Filed: Mar. 8, 2017

(65) Prior Publication Data

US 2017/0308239 A1 Oct. 26, 2017

(30) Foreign Application Priority Data

Apr. 22, 2016 (JP) ................. 2016-086097

(51) Int. Cl.
*G06F 3/041* (2006.01)
*B60N 2/75* (2018.01)
*B60K 35/00* (2006.01)
*B60N 2/58* (2006.01)
*G06K 9/00* (2006.01)
*B60K 37/06* (2006.01)
(Continued)

(52) U.S. Cl.
CPC ........... *G06F 3/0418* (2013.01); *B60K 35/00* (2013.01); *B60K 37/06* (2013.01); *B60N 2/0228* (2013.01); *B60N 2/58* (2013.01); *B60N 2/5891* (2013.01); *B60N 2/797* (2018.02); *G06F 3/017* (2013.01); *G06F 3/044* (2013.01); *G06F 3/0425* (2013.01); *G06K 9/00604* (2013.01); *B60K 2370/141* (2019.05); *B60K 2370/143* (2019.05); *B60K 2370/149* (2019.05); *B60K 2370/152* (2019.05); *B60K 2370/21* (2019.05); *B60K 2370/33* (2019.05); *B60K 2370/55* (2019.05); *B60K 2370/77* (2019.05); *G06F 2203/0381* (2013.01); *G06F 2203/04101* (2013.01); *G06F 2203/04102* (2013.01)

(58) Field of Classification Search
CPC ... G06F 3/041–044; G06F 2203/04102; B60K 35/00; B60K 2350/1024; B60K 2350/2013; B60K 2350/106; B60N 2/58
See application file for complete search history.

(56) References Cited

U.S. PATENT DOCUMENTS

2009/0195659 A1 8/2009 Nagata et al.
2012/0032903 A1 2/2012 Yamamoto et al.
(Continued)

FOREIGN PATENT DOCUMENTS

JP 2005-152257 A 6/2005
JP 2009-181423 A 8/2009
(Continued)

OTHER PUBLICATIONS

"Google Project Jacquard" retrieved from internet (https://atap.google.com/jacquard/).

*Primary Examiner* — Liliana Cerullo
(74) *Attorney, Agent, or Firm* — Oliff PLC (57) ABSTRACT

A vehicle input device including: a cover configured to include a touch sensor portion that is flexible and that detects operation by an occupant, the cover covering a main body portion of an arm rest that supports an arm of the occupant; and a control unit that outputs an operation signal to an on-board instrument on the basis of a signal detected by the touch sensor portion.

16 Claims, 7 Drawing Sheets

(51) Int. Cl.
    *G06F 3/01*          (2006.01)
    *G06F 3/042*        (2006.01)
    *G06F 3/044*        (2006.01)
    *B60N 2/02*         (2006.01)

(56) References Cited

U.S. PATENT DOCUMENTS

| | | | |
|---|---|---|---|
| 2012/0287076 A1* | 11/2012 | Dao | G06F 1/1626 |
| | | | 345/174 |
| 2014/0043241 A1* | 2/2014 | Sukumar | G06F 3/013 |
| | | | 345/173 |
| 2015/0200665 A1 | 7/2015 | Arakawa | |
| 2015/0212584 A1* | 7/2015 | Aoyama | G06F 3/017 |
| | | | 345/173 |
| 2015/0370329 A1* | 12/2015 | Koyama | G06F 3/016 |
| | | | 345/173 |
| 2016/0048235 A1* | 2/2016 | Poupyrev | G06F 3/044 |
| | | | 345/174 |
| 2016/0104486 A1* | 4/2016 | Penilla | H04L 67/12 |
| | | | 704/232 |
| 2017/0031496 A1* | 2/2017 | Joo | G06F 3/04883 |
| 2017/0060190 A1* | 3/2017 | Hegde | B29C 70/78 |

FOREIGN PATENT DOCUMENTS

| | | |
|---|---|---|
| JP | 2012-037979 A | 2/2012 |
| JP | 2015-133045 A | 7/2015 |
| JP | 2016-004541 A | 1/2016 |
| WO | 2016/025554 A1 | 2/2016 |

\* cited by examiner

VEHICLE INPUT DEVICE

CROSS-REFERENCE TO RELATED APPLICATION

This application is based on and claims priority under 35 USC 119 from Japanese Patent Application No. 2016-086097 filed on Apr. 22, 2016, the disclosure of which is incorporated by reference herein.

BACKGROUND

Technical Field

The present disclosure relates to a vehicle input device.

Related Art

Japanese Patent Application Laid-open (JP-A) No. 2015-133045 discloses a vehicle input device where a touch switch (touch pad) is provided in an arm rest of a vehicle.

In this vehicle input device, the touch switch can be operated within easy reach of the hand of an occupant, so user-friendliness for the occupant can be improved.

The cover of the arm rest is usually formed as a sheet that is flexible. In contrast, the touch switch (touch pad) is configured by a resin material, for example, that is harder than the cover. For this reason, when the arm or the like of the occupant is supported by the arm rest, the tactile sensations that the occupant receives from the cover and the touch switch (touch pad) are different, so there is the potential for these different tactile sensations to impart a sense of incongruity to the occupant.

SUMMARY

In consideration of the circumstances described above, the present disclosure provides a vehicle input device whose user-friendliness can be improved while controlling the sense of incongruity imparted to the occupant.

A vehicle input device of a first aspect of the disclosure includes: a cover configured to include a touch sensor portion that is flexible and that detects operation by an occupant, the cover covering a main body portion of an arm rest that supports an arm of the occupant; and a control unit that outputs an operation signal to an on-board instrument on the basis of a signal detected by the touch sensor portion.

In the vehicle input device of the first aspect of the disclosure, the main body portion of the arm rest of the vehicle is covered by the cover. Here, the cover is configured to include the touch sensor portion. The touch sensor portion detects the operation thereof by the occupant, and the control unit outputs the operation signal to the on-board instrument on the basis of the signal detected by the touch sensor portion. For this reason, operation of the on-board instrument can be done within easy reach of the hand of the occupant, so user-friendliness for the occupant can be improved.

Moreover, the touch sensor portion is flexible. For this reason, when the arm of the occupant is supported by the arm rest, differences in the tactile sensations that the occupant receives from the touch sensor portion of the cover and the section of the cover outside the touch sensor portion can be reduced. Because of this, the sense of incongruity imparted to the occupant can be controlled.

A vehicle input device of a second aspect of the disclosure is the vehicle input device of the first aspect, wherein the control unit changes a detection range of the touch sensor portion on the basis of information indicating a position of a hand of the occupant placed on the touch sensor portion.

In the vehicle input device of the second aspect of the disclosure, the detection range in the touch sensor portion is changed by the control unit on the basis of the position information of the hand of the occupant placed on the touch sensor portion. For this reason, the detection range in the touch sensor portion can be changed in correspondence to, for example, the posture of the occupant. Because of this, user-friendliness for the occupant can be improved even more.

A vehicle input device of a third aspect of the disclosure is the vehicle input device of the first aspect, further including a position detection device that detects a position of a hand of the occupant, wherein the control unit changes a detection range of the touch sensor portion on the basis of information indicating the position of the hand of the occupant detected by the position detection device.

In the vehicle input device of the third aspect of the disclosure, like in the second aspect, the detection range in the touch sensor portion is changed by the control unit in accordance with the position of the hand of the occupant placed on the touch sensor portion. For this reason, in the third aspect also, like in the second aspect, user-friendliness for the occupant can be improved even more.

A vehicle input device of a fourth aspect of the disclosure is the vehicle input device of any one of the first to third aspects, further including a sightline detection device that detects a sightline of the occupant, wherein the control unit determines whether or not the sightline of the occupant is directed toward the on-board instrument on the basis of information detected by the sightline detection device and, when the sightline of the occupant is directed toward the on-board instrument, validates the operation of the touch sensor portion by the occupant.

In the vehicle input device of the fourth aspect of the disclosure, when the sightline of the occupant is directed toward the on-board instrument, the operation of the touch sensor portion by the occupant is validated by the control unit. For this reason, input operations corresponding to the operational intent of the occupant can be realized.

A vehicle input device of a fifth aspect of the disclosure is the vehicle input device of any one of the first to third aspects, wherein the control unit determines whether or not the operation of the touch sensor portion by the occupant is a predetermined operation and, when the operation is the predetermined operation, validates the operation of the touch sensor portion by the occupant.

In the vehicle input device of the fifth aspect of the disclosure, the operation of the touch sensor portion by the occupant is validated by the control unit when the operation of the touch sensor portion by the occupant is the predetermined operation. For this reason, like in the fourth aspect, input operations corresponding to the operational intent of the occupant can be realized.

A vehicle input device of a sixth aspect of the disclosure is the vehicle input device of any one of the first to fifth aspects, wherein light sources are provided on a back surface side of the cover, and the touch sensor portion is illuminated as a result of the light sources emitting light so that a region of the touch sensor portion is made visible from a front surface side of the cover.

In the vehicle input device of the sixth aspect of the disclosure, the touch sensor portion is illuminated as a result of the light sources provided on the back surface side of the cover emitting light. Additionally, the region of the touch sensor portion is made visible from the front surface side of the cover. For this reason, the occupant can recognize the region of the touch sensor portion of the cover. Because of this, operability for the occupant can be improved.

According to the vehicle input device of the first aspect of the disclosure, user-friendliness can be improved while controlling the sense of incongruity imparted to the occupant.

According to the vehicle input device of the second and third aspects of the disclosure, user-friendliness for the occupant can be improved even more.

According to the vehicle input device of the fourth and fifth aspects of the disclosure, input operations corresponding to the operational intent of the occupant can be realized.

According to the vehicle input device of the sixth aspect of the disclosure, operability for the occupant can be improved.

BRIEF DESCRIPTION OF THE DRAWINGS

An exemplary embodiment of the present disclosure will be described in detail based on the following figures, wherein.

DETAILED DESCRIPTION

A vehicle input device 40 pertaining to an embodiment of the present disclosure will be described below using the drawings. The vehicle input device 40 is applied to an arm rest 20 of a vehicle seat 10 installed in a cabin C of a vehicle (automobile) V. Below, first the general configuration of the cabin C of the vehicle V will be described and then the vehicle input device 40 will be described. It should be noted that arrow FR appropriately shown in the drawings indicates the vehicle forward direction of the vehicle V to which the vehicle input device 40 has been applied, arrow UP indicates the vehicle upward direction, and arrow LH indicates the vehicle leftward direction (one direction in the vehicle width direction).

(General Configuration of Cabin)

Figure 2:
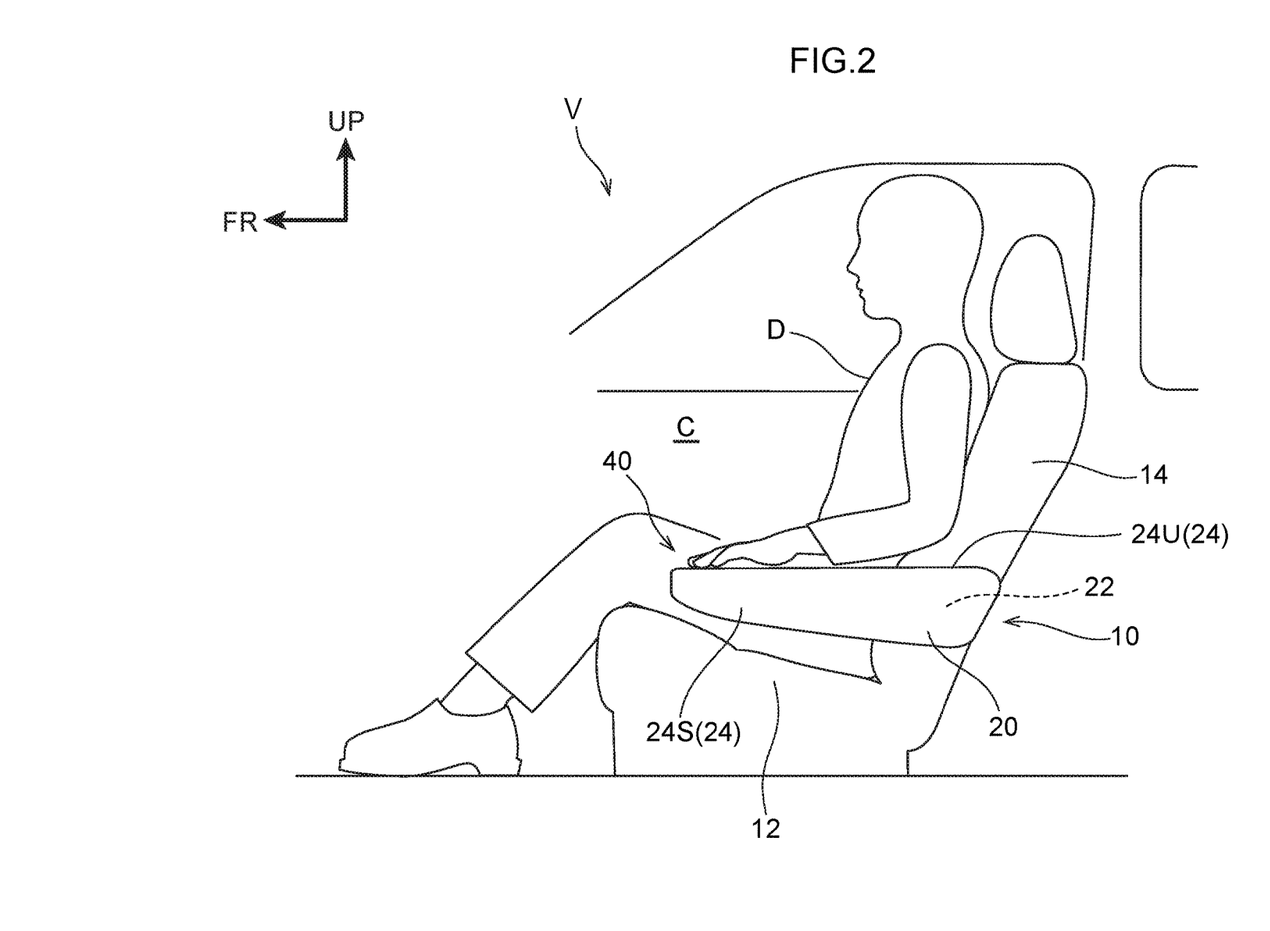
FIG. 2 is a side view, seen from a vehicle left side, showing a cabin interior of a vehicle to which the vehicle input device shown in FIG. 1 has been applied.

As shown in FIG. 2, a right and left pair of vehicle seats 10 are disposed adjacent to each other in the vehicle width direction in the front portion of the cabin C (FIG. 2 shows only the vehicle seat 10 disposed in the right side portion of the cabin C). The vehicle seat 10 is configured to include a seat cushion 12, which supports the buttocks of a seated occupant D serving as an "occupant," and a seat back 14, which supports the back of the seated occupant D. The lower end portion of the seat back 14 is coupled to the rear end portion of the seat cushion 12. Additionally, the seat forward direction of the vehicle seat 10 coincides with the vehicle forward direction of the vehicle V, and the seat width direction of the vehicle seat 10 coincides with the vehicle width direction of the vehicle V.

An arm rest 20 that supports an arm of the seated occupant D is provided in a side portion of the seat back 14 on the vehicle width direction central side (the left side of the vehicle seat 10 shown in FIG. 2). The arm rest 20 extends in the forward and rearward direction, and the rear end portion of the arm rest 20 is coupled to the seat back 14. Furthermore, the interior of the arm rest 20 is a main body portion 22, and the main body portion 22 is configured to include padding configured by urethane or other foam. The main body portion 22 is covered by an arm rest cover 24. The arm rest cover 24 is configured to include a side cover 24S, which covers the main body portion 22 from the front and the right and left directions, and an upper cover 24U, which serves as a "cover" that covers the main body portion 22 from the upper side. The upper cover 24U configures part of the vehicle input device 40 described later. The upper cover 24U will be described in conjunction with the vehicle input device 40 described later.

Figure 3:
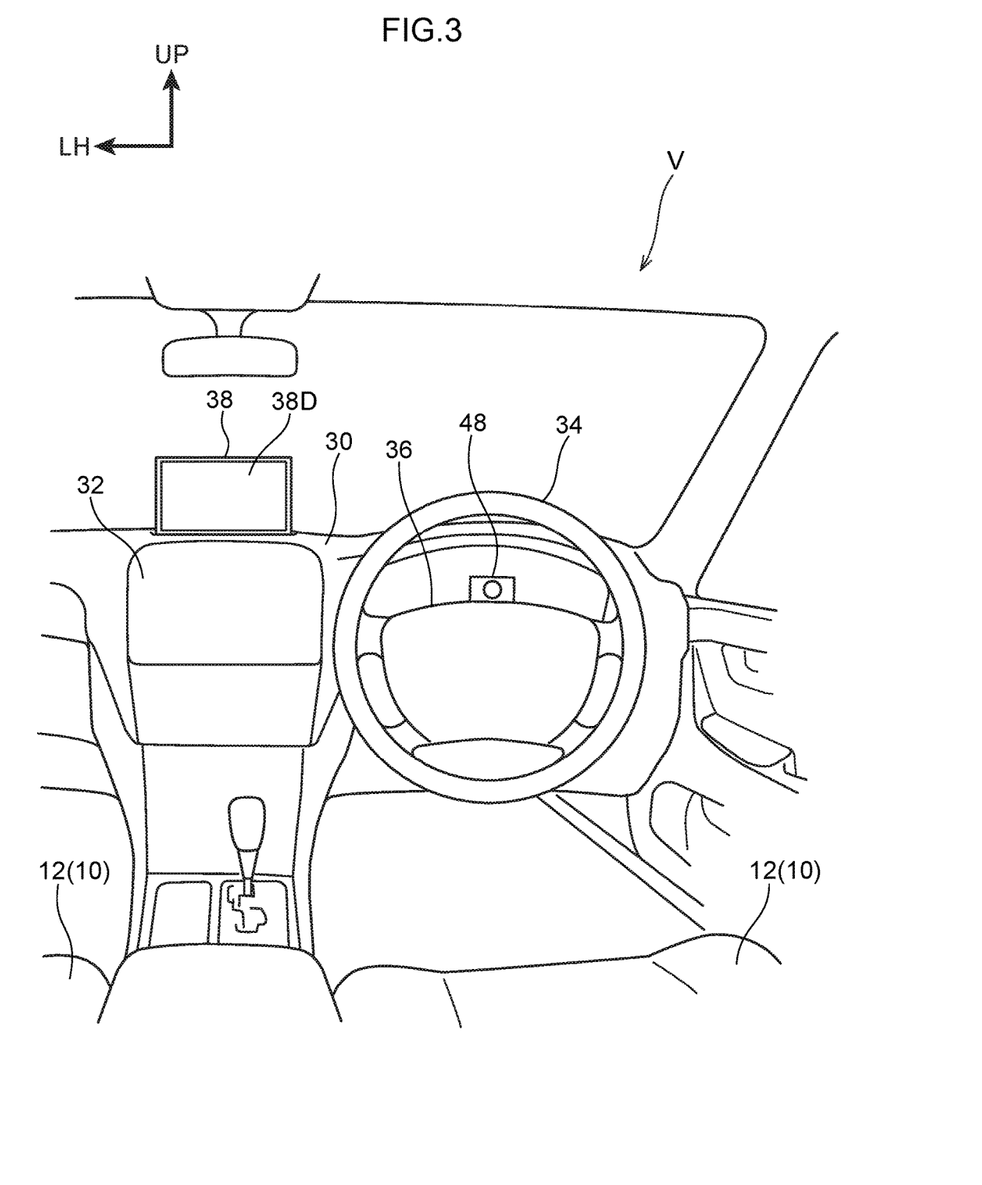
FIG. 3 is a rear view, seen from the vehicle rear side, showing the area around an instrument panel disposed in the front end portion of the cabin shown in FIG. 2.

As shown in FIG. 3, an instrument panel 30 that extends in the vehicle width direction is provided on the front side of the vehicle seat 10, and a center panel 32 is provided in the vehicle width direction central portion of the instrument panel 30. Furthermore, a steering wheel 34 is disposed in the right side section of the instrument panel 30. The steering wheel 34 is supported via a steering column (not shown in the drawings) that supports a wheel pad 36, and the steering wheel 34 is disposed on the rear side of the instrument panel 30. Because of this, in the present embodiment, the vehicle seat 10 disposed in the right side section of the front portion of the cabin C is a driver's seat, and the vehicle seat 10 disposed in the left side section of the front portion of the cabin C is a front passenger seat.

A navigation device 38 serving as an "on-board instrument" is disposed in the vehicle width direction central portion of the instrument panel 30. The navigation device 38 has a display 38D, and the display 38D is disposed facing rearward. Icons or the like for having the navigation device 38 execute predetermined actions are displayed on the display 38D, and by selecting those icons, the predetermined actions are executed in the navigation device 38. In the present embodiment, operation of the navigation device 38 is done by means of the vehicle input device 40 described below.

(Vehicle Input Device)

Figure 1:
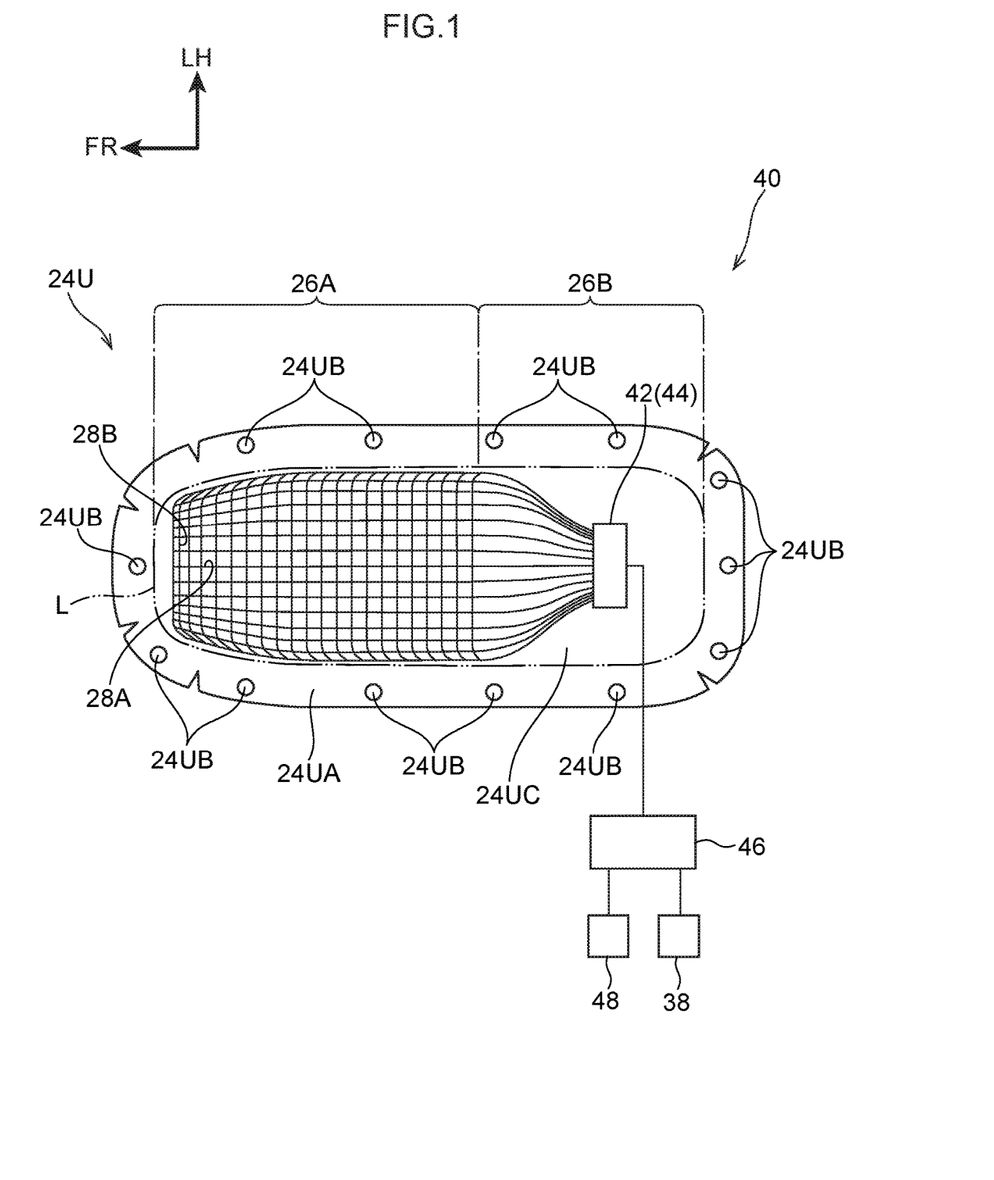
FIG. 1 is a schematic bottom view, seen from a back surface side of an upper cover, showing the configuration of a vehicle input device pertaining to the embodiment.

As shown in FIG. 2, the vehicle input device 40 is, in the present embodiment, provided in the arm rest 20 of the vehicle seat 10 that is the driver's seat. As shown in FIG. 1, the vehicle input device 40 is configured to include the upper cover 24U of the arm rest 20 and an ECU 46 serving as a "control unit" that outputs operation signals to the navigation device 38. The vehicle input device 40 also has a cabin camera 48 serving as a "sightline detection device" and a "position detection device" that detect the sightline and the position of the hand of the seated occupant D (driver). The configurations of each will be described below.

The upper cover 24U is made of cloth, for example, and is formed as a substantially rectangular sheet. An outer peripheral portion 24UA (the section outside a hypothetical line L indicated as a long dashed double-short dashed line in FIG. 1) of the upper cover 24U is folded downward at the hypothetical line L and is disposed inside the upper end portion of the side cover 24S (see FIG. 2). The outer peripheral portion 24UA of the upper cover 24U is secured to the upper end portion of the side cover 24S by, for example, fusing them to each other at the positions of plural joint portions 24UB (the portions indicated by circles in FIG. 1), and the joint portions 24UB are disposed a predetermined distance apart from each other in the circumferential direction of the upper cover 24U. Because of this, the section of the upper cover 24U inside the hypothetical line L is a design portion 24UC configuring a design surface of the upper cover 24U.

Furthermore, part of the design portion 24UC of the upper cover 24U is a touch sensor portion 26A for inputting operational instructions to the navigation device 38. In the present embodiment, the front section of the design portion 24UC is the touch sensor portion 26A and the rear section of the design portion 24UC is a non-operable portion 26B. The touch sensor portion 26A is configured as a touch sensor made of cloth, and when the fingers or the like of the seated occupant D are touched to the touch sensor portion 26A, the touch sensor portion 26A detects the operation of the touch sensor portion 26A by the seated occupant D. Because of this, operational instructions from the seated occupant D to the navigation device 38 are input to the touch sensor portion 26A.

An example of the structure of the upper cover 24U will be briefly described below. The touch sensor portion 26A of the upper cover 24U has plural warp threads 28A comprising conductive threads covered by a nonconductive material, and the warp threads 28A extend in the forward and rearward direction and are disposed adjacent to each other in the rightward and leftward direction. The touch sensor portion 26A also has plural weft threads 28B comprising conductive threads covered by a nonconductive material, and the weft threads 28B extend in the rightward and leftward direction and are disposed adjacent to each other in the forward and rearward direction. The warp threads 28A and the weft threads 28B are plain woven so that the touch sensor portion 26A is configured as a weave that is flexible.

Because of this, the conductive threads of the warp threads 28A and the conductive threads of the weft threads 28B are spaced a predetermined distance apart from each other, so the spaces between the conductive threads of the warp threads 28A and the conductive threads of the weft threads 28B act as capacitors. The capacitance between the conductive threads of the warp threads 28A and the conductive threads of the weft threads 28B changes when the fingers or the like of the occupant are touched to the touch sensor portion 26A, so by detecting the changes in the capacitance, the operation position of the hand (fingers) of the seated occupant D touched to the touch sensor portion 26A is detected. Specifically, the warp threads 28A and the weft threads 28B are connected to a circuit board 42, and an operation position detection component 44 that detects the operation position of the hand (fingers) of the seated occupant D touched to the touch sensor portion 26A is installed in the circuit board 42. It should be noted that the weave structure of the touch sensor portion 26A is not limited to the weave structure described above. For example, nonconductive threads may be disposed between warp threads 28A adjacent to each other in the rightward and leftward direction so that the warp threads 28A having conductive threads are disposed a predetermined distance apart from each other, and nonconductive threads may be disposed between weft threads 28B adjacent to each other in the forward and rearward direction so that the weft threads 28B having conductive threads are disposed a predetermined distance apart from each other.

Although it is not shown in the drawings, in the non-operable portion 26B of the upper cover 24U, warp threads and weft threads configured by nonconductive threads are plain woven, for example, so that the non-operable portion 26B of the upper cover 24U is configured as a weave that is flexible. It should be noted that the weave structure of the non-operable portion 26B of the upper cover 24U can be appropriately changed in accordance with the design of the vehicle V, for example.

The operation position detection component 44 is also electrically connected to the ECU 46, and the navigation device 38 is electrically connected to the ECU 46. The ECU 46 is configured to calculate, on the basis of an operation position signal detected by the operation position detection component 44, the position on the display 38D of the navigation device 38 corresponding to the operation position operated by the seated occupant D and output an operation signal to the navigation device 38. Because of this, an icon or the like displayed on the display 38D of the navigation device 38 is selected and the navigation device 38 executes a predetermined action.

The cabin camera 48, which captures an image of the seated occupant D to detect the state of the seated occupant D, is electrically connected to the ECU 46. The cabin camera 48 is secured to the top of the steering column (not shown in the drawings). The cabin camera 48 detects the sightline of both eyes of the seated occupant D. For example, the cabin camera 48 captures an image of the face of the seated occupant D and outputs to the ECU 46 sightline detection data relating to the sightline of the seated occupant D that has been detected. It should be noted that the cabin camera 48 is not limited to this configuration. For example, the cabin camera 48 may also be configured to project infrared radiation onto the face of the seated occupant D, receive the radiation reflected from the seated occupant D, and output the sightline detection data to the ECU 46. The ECU 46 is also configured to detect the sightline of the seated occupant D on the basis of the sightline detection data from the cabin camera 48 and determine whether or not the sightline of the seated occupant D is directed toward the navigation device 38. In a case where the ECU 46 has determined that the sightline of the seated occupant D is directed toward the navigation device 38, the ECU 46 is set to validate the operation of the touch panel portion 26A by the seated occupant D.

Figure 4A:
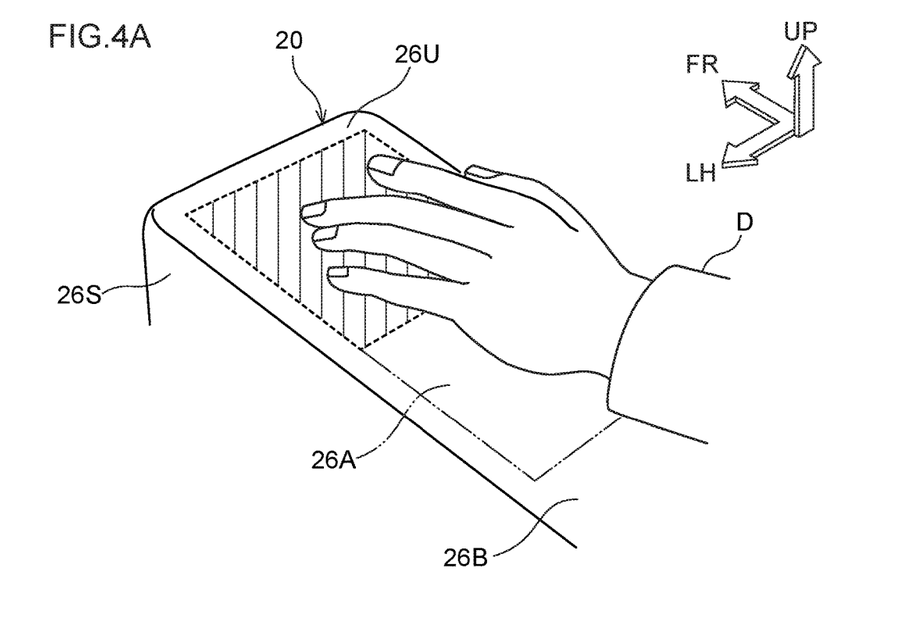
FIG. 4A is a perspective view showing an example of a sensing area of a touch sensor portion shown in FIG. 1.
Figure 4B:
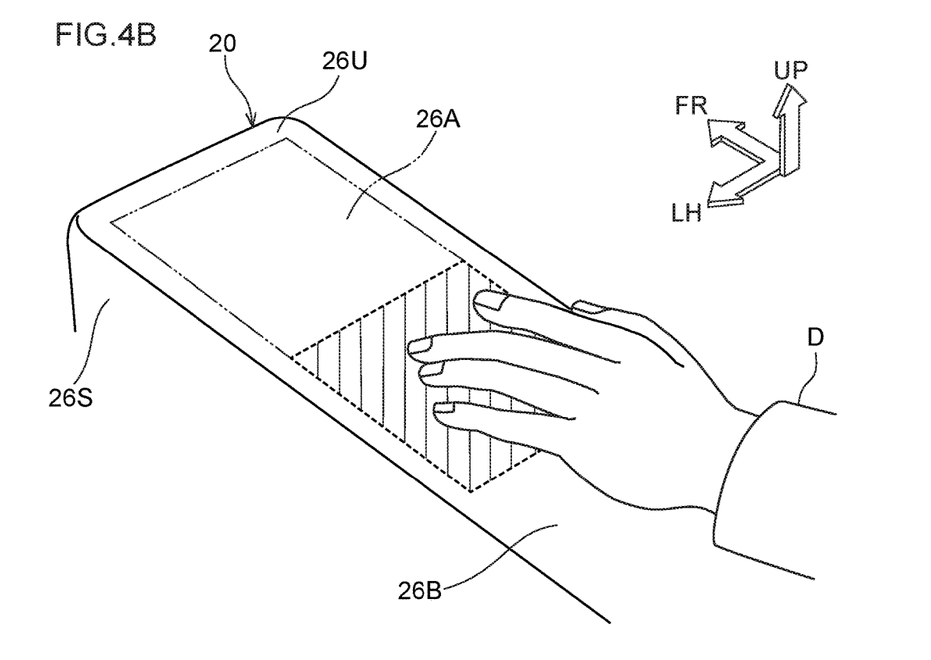
FIG. 4B is a perspective view showing another example of the sensing area of the touch sensor portion shown in FIG. 1.

The cabin camera 48 is also configured to detect the position of the hand of the occupant D. For example, the cabin camera 48 is configured to capture an image of the upper body of the seated occupant D and output to the ECU 46 position detection data relating to the position of the hand of the seated occupant D that has been detected. The ECU 46 is also configured to detect (calculate) the position of the hand of the seated occupant D on the basis of the position detection data from the cabin camera 48 and set a sensing area (a region made capable of detection in the touch sensor portion 26A; this region corresponds to the "detection range" of the disclosure) in the touch sensor portion 26A. For example, in a case where the palm of the hand of the seated occupant D is placed on top of the rear portion of the touch sensor portion 26A, the ECU 46 sets as the sensing area the region located on the front side of the palm of the hand of the seated occupant D and in the front portion of the touch sensor portion 26A (see the region with the hatching in FIG. 4A). Furthermore, for example, in a case where the position of the palm of the hand of the seated occupant D is disposed on the rear side of the touch sensor portion 26A, the ECU 46 sets the rear portion of the touch sensor portion 26A as the sensing area (see the region with the hatching in FIG. 4B). It should be noted that the shape and area of the sensing area of the touch sensor portion 26A can be arbitrarily set.

Furthermore, in the present embodiment, the ECU 46 is configured to determine whether or not an operation of the touch sensor portion 26A by the seated occupant D is an operation intended by the seated occupant D. Specifically, the ECU 46 is configured to determine whether or not the seated occupant D has input a predetermined operation to the touch sensor portion 26A. The predetermined operation is, in the present embodiment, set to an operation in which the seated occupant D successively touches (knocks) the touch sensor portion 26A three times. In a case where the operation by the seated occupant D is not the predetermined operation, the ECU 46 is set to invalidate the operation of the touch sensor portion 26A. On the other hand, in a case where the operation by the seated occupant D is the predetermined operation, the ECU 46 is set to validate the operation of the touch sensor portion 26A.

Next, the action and effects of the present embodiment will be described while describing, using the flowchart shown in FIG. 5, an operation of the navigation device 38 using the vehicle input device 40.

Figure 5:
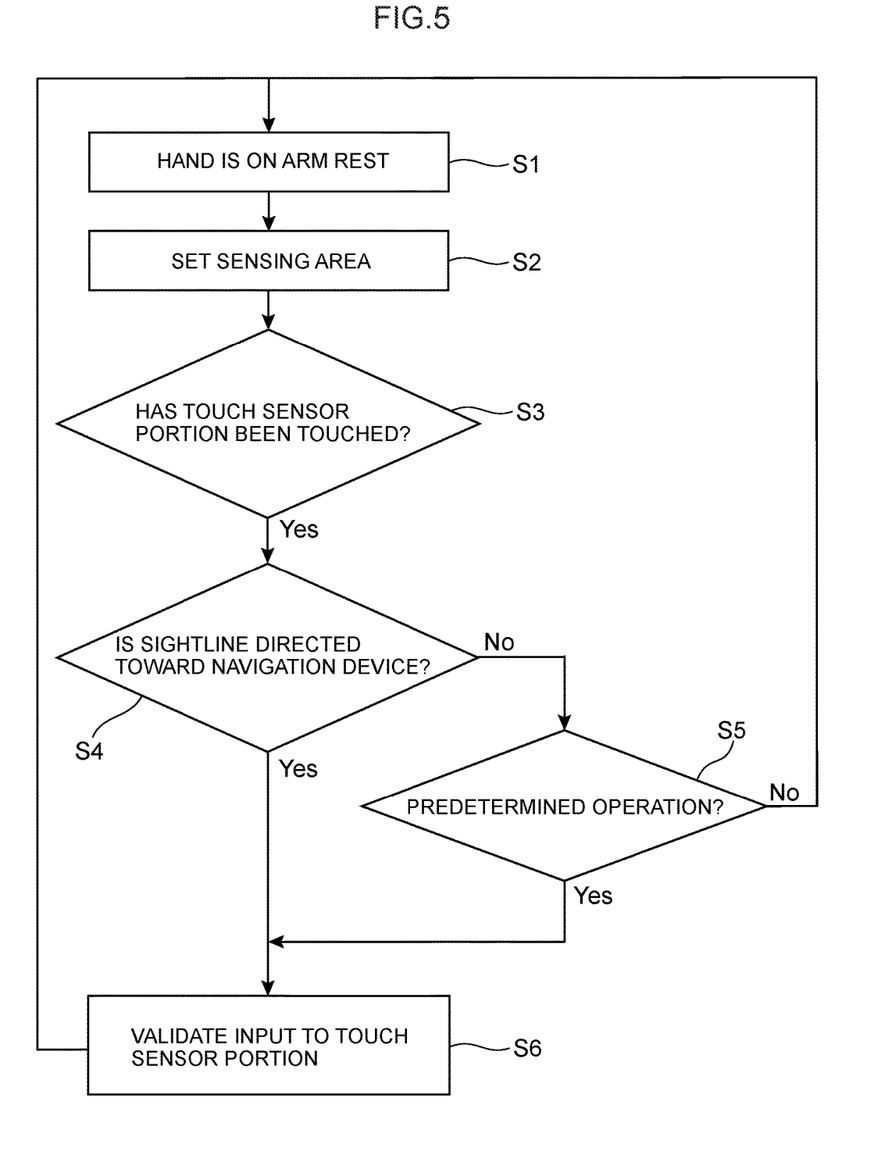
FIG. 5 is a flowchart for describing the working of the vehicle input device shown in FIG. 1.

As shown in FIG. 5, when in step 1 the ECU 46 detects that the hand of the seated occupant D is disposed on the upper side of the arm rest 20 on the basis of the position detection data output from the cabin camera 48, the ECU 46 moves to step 2. In step 2 the ECU 46 detects the position of the hand of the seated occupant D on the basis of the position detection data and sets the sensing area in the touch sensor portion 26A of the upper cover 24U. Then, after executing step 2, the ECU 46 moves to step 3.

In step 3 the ECU 46 determines whether or not the seated occupant D has operated (touched) the sensing area of the touch sensor portion 26A on the basis of the operation position signal detected by the operation position detection component 44. When the ECU 46 has detected that the seated occupant D has operated (touched) the sensing area of the touch sensor portion 26A, the ECU 46 moves to step 4.

In step 4 the ECU 46 determines whether or not the sightline of the seated occupant D is directed toward the navigation device 38 on the basis of the sightline detection data output from the cabin camera 48 to the ECU 46. When the ECU 46 determines that the sightline of the seated occupant D is directed toward the navigation device 38, the ECU 46 moves to step 6.

In step 6 the ECU 46 judges that the seated occupant D intends to operate the navigation device 38 because the sightline of the seated occupant D is directed toward the navigation device 38. For this reason, the ECU 46 validates the operation of the sensing area of the touch sensor portion 26A. On the basis of the operation position signal detected by the operation detection position component 44, the ECU 46 also calculates the position on the display 38D of the navigation device 38 corresponding to the operation position of the seated occupant D and outputs an operation signal to the navigation device 38. Because of this, for example, an icon or the like displayed on the display 38D of the navigation device 38 is selected and the navigation device 38 executes a predetermined action.

When in step 4 the ECU 46 determines that the sightline of the seated occupant D is not directed toward the navigation device 38, the ECU 46 moves to step 5. In step 5 the ECU 46 determines whether or not the operation (touching) of the sensing area of the touch sensor portion 26A by the seated occupant D is the predetermined operation. Specifically, the ECU 46 distinguishes whether or not the seated occupant D has successively touched (knocked) the touch sensor portion 26A (the sensing area) three times. When the ECU 46 determines that the operation of the touch sensor portion 26A (the sensing area) by the seated occupant D is not the predetermined operation, the ECU 46 moves to step 1.

In a case where the ECU 46 has determined that the operation of the touch sensor portion 26A (the sensing area) by the seated occupant D is the predetermined operation, it is estimated that the operation of the touch sensor portion 26A by the seated occupant D is an operation intended by the seated occupant D, so the ECU 46 moves to step 6. In step 6 the ECU 46 validates the operation of the sensing area of the touch sensor portion 26A. On the basis of the operation position signal detected by the operation position detection component 44, the ECU 46 also calculates the position on the display 38D of the navigation device 38 corresponding to the operation position of the seated occupant D and outputs an operation signal to the navigation device 38. Because of this, for example, an icon or the like displayed on the display 38D of the navigation device 38 is selected and the navigation device 38 executes a predetermined action.

Here, in the present embodiment, the vehicle input device 40 is equipped with the upper cover 24U that covers the main body portion 22 of the arm rest 20, and the upper cover 24U has the touch sensor portion 26A that detects operations by the seated occupant D. Because of this, operation of the navigation sensor 38 can be done within easy reach of the hand of the seated occupant D, so user-friendliness for the seated occupant D can be improved. Furthermore, the touch sensor portion 26A is configured as a touch sensor that is flexible and made of cloth. For this reason, when the arm of the occupant D is supported by the arm rest 20, differences in tactile sensations that the seated occupant D receives from the touch sensor portion 26A and the non-operable portion 26B of the upper cover 24U can be reduced. Because of this, the sense of incongruity imparted to the seated occupant D can be controlled. More specifically, the arm rest 20 can be made to function as a touch sensor (touch pad) while maintaining the softness of the arm rest 20 and the cushioning property of the main body portion 22 of the arm rest 20. Hence, according to the vehicle input device 40 pertaining to the present embodiment, user-friendliness can be improved while controlling the sense of incongruity imparted to the seated occupant D.

Furthermore, the vehicle input device 40 has the cabin camera 48. The cabin camera 48 detects the position of the hand of the seated occupant D, and the ECU 46 sets the sensing area in the touch sensor portion 26A on the basis of the position detection data output from the cabin camera 48. For this reason, for example, misdetections by the ECU 46 caused by the palm of the hand of the seated occupant D touching the touch sensor portion 26A can be controlled. Furthermore, a sensing area according to the position of the fingers of the seated occupant D is set in the touch sensor portion 26A, so user-friendliness for the seated occupant D can be improved even more.

Figure 6:
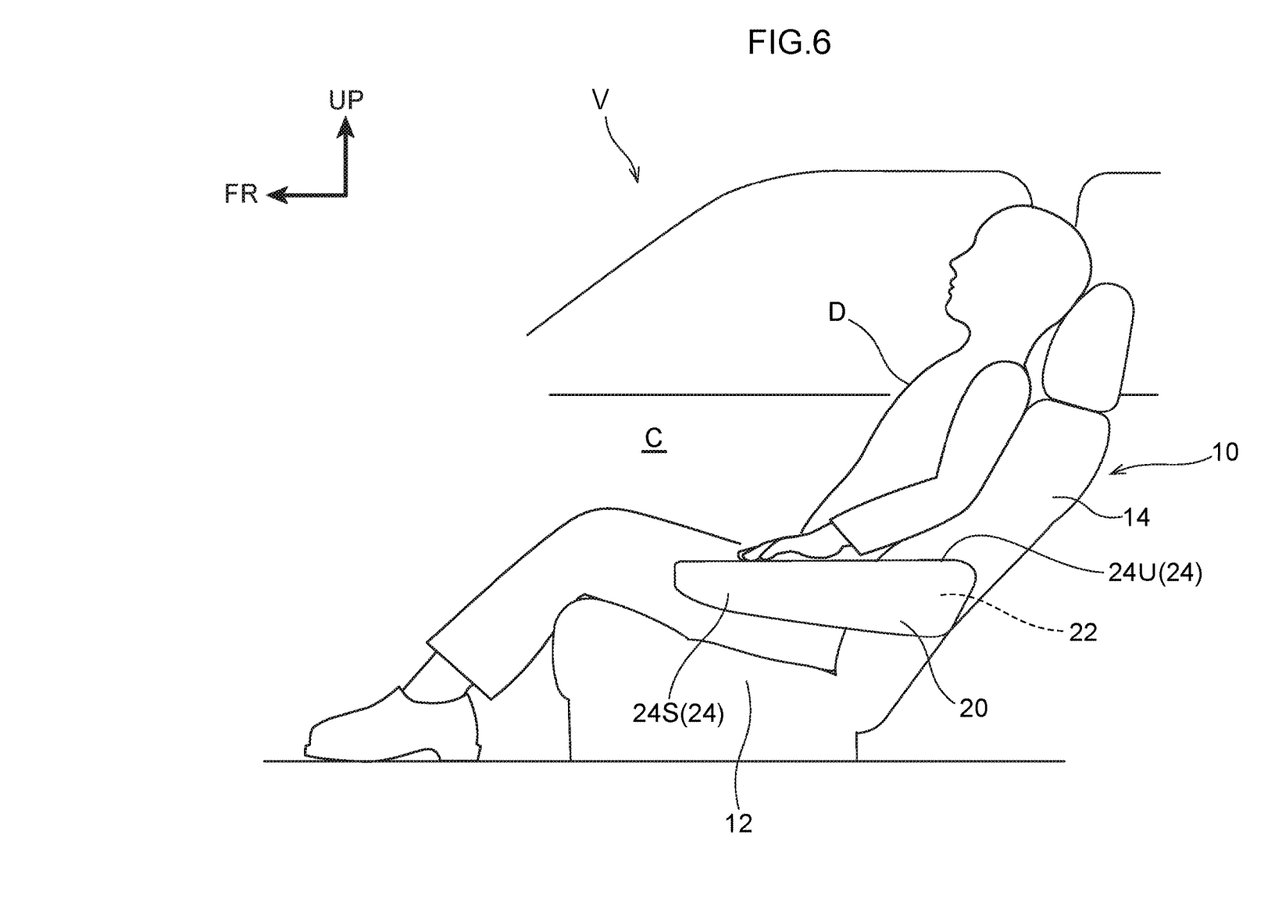
FIG. 6 is a side view showing the posture of a seated occupant when a seat back shown in FIG. 2 has been tilted back.

Furthermore, for example, as shown in FIG. 6, when the seated occupant D tilts back (reclines) the seat back 14, the position of the hand of the seated occupant D tends to move to the rear side of the arm rest 20. For this reason, in the vehicle input device 40 of the present embodiment, the sensing area of the touch sensor portion 26A can be changed in accordance with the sitting posture of the seated occupant D. Consequently, in this respect also, user-friendliness for the seated occupant D can be improved even more.

Moreover, the vehicle input device 40 has the cabin camera 48 that detects the sightline of the seated occupant D. When the ECU 46 determines that the sightline of the seated occupant D is directed toward the navigation device 38 on the basis of the sightline detection data captured by the cabin camera 48, the ECU 46 validates the operation of the touch sensor portion 26A. For this reason, input operations corresponding to the operational intent of the seated occupant D can be realized. Furthermore, conversely, when the ECU 46 determines that the sightline of the seated occupant D is not directed toward the navigation device 38, the ECU 46 can invalidate the operation of the touch sensor portion 26A. For this reason, if the fingers of the seated occupant D inadvertently touch the touch sensor portion 26A, the navigation device 38 can be kept from working counter to the intent of the seated occupant D.

Moreover, in the vehicle input device 40, the ECU 46 determines whether or not the operation (touching) of the sensing area of the touch sensor portion 26A by the seated occupant D is the predetermined operation intended by the seated occupant D. In a case where the operation of the sensing area of the touch sensor portion 26A by the seated occupant D is the predetermined operation, the ECU 46 validates the operation of the touch sensor portion 26A. Thus, in this case also, input operations corresponding to the operational intent of the seated occupant D can be realized. Furthermore, conversely, in a case where the operation (touching) of the sensing area of the touch sensor portion 26A by the seated occupant D is not the predetermined operation, the operation of the touch sensor portion 26A can be invalidated. Thus, in the same way as described above, for example, if the fingers of the seated occupant D inadvertently touch the touch sensor portion 26A, the navigation device 38 can be kept from working counter to the intent of the seated occupant D.

In the present embodiment, the vehicle input device 40 has a configuration where the cabin camera 48 detects the position of the hand of the seated occupant D and the ECU 46 sets the sensing area of the touch sensor portion 26A in the upper cover 24U on the basis of the position detection data output from the cabin camera 48. Instead of this, the vehicle input device 40 may have a configuration where the touch sensor portion 26A detects the position of the hand of the seated occupant D and the ECU 46 sets the sensing area of the touch sensor portion 26A in the upper cover 24U. In this case, the touch sensor portion 26A corresponds to the "position detection device" of the disclosure. An example of a method where the position of the hand of the seated occupant D is detected by the touch sensor portion 26A to set the sensing area of the touch sensor portion 26A will be described below. For example, when the hand of the seated occupant D is placed on the touch sensor portion 26A, the section of the touch sensor portion 26A touched by the hand of the seated occupant D can be detected by the operation position detection component 44. At the same time, data of a shape pattern in which the shape of the hand is modeled is stored beforehand in a memory or the like in the ECU 46. The ECU 46 detects the position of the hand of the seated occupant D by comparing the data detected by the operation position detection component 44 and the data of the shape pattern stored in the memory. The ECU 46 then sets the sensing area of the touch sensor portion 26A in the upper cover 24U on the basis of the position of the hand of the seated occupant D that has been detected. Because of this, the position of the hand of the seated occupant D can be detected by the touch sensor portion 26A to set the sensing area of the touch sensor portion 26A.

Figure 7:
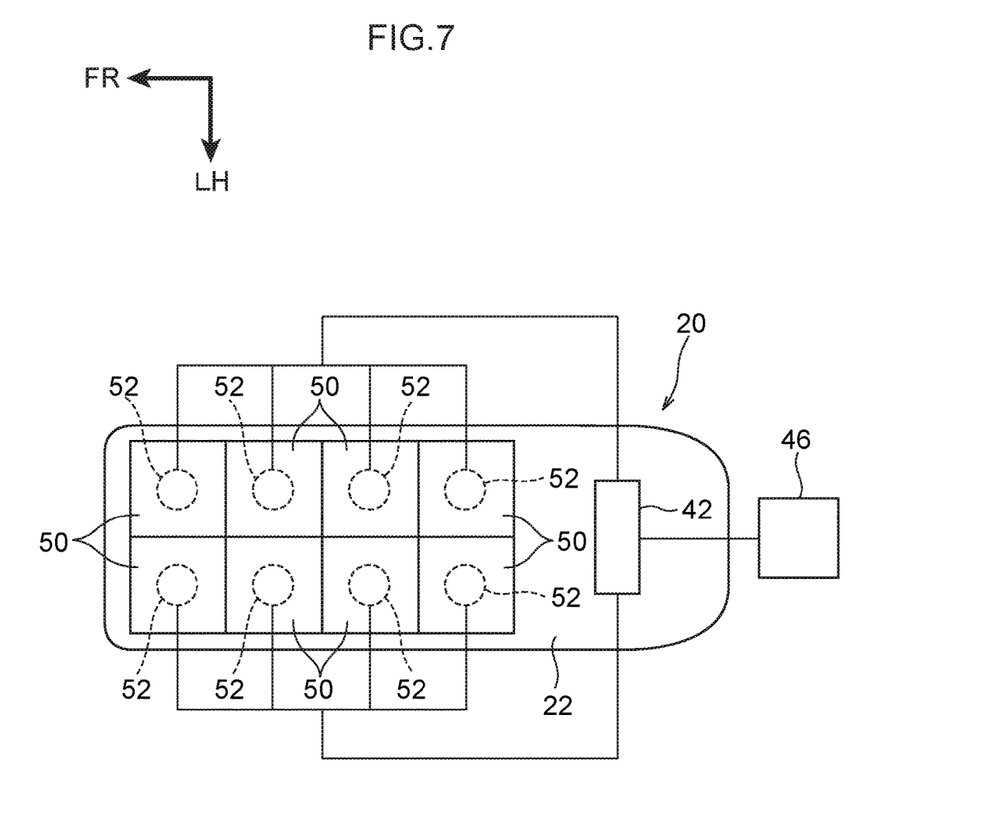
FIG. 7 is a schematic plan view, seen from above, showing an example where LEDs are provided in a main body portion of the arm rest shown in FIG. 2.

Furthermore, the vehicle input device 40 of the present embodiment may also have a configuration where the sensing area of the touch sensor portion 26A is made visible to the seated occupant D. An example where the sensing area of the touch sensor portion 26A is made visible will be described below using FIG. 7. As shown in FIG. 7, plural (eight in the present embodiment) lenses 50 are disposed on the upper side of the main body portion 22 of the arm rest 20. The lenses 50 are each formed as substantially rectangular plates and are disposed adjacent to each other in the forward and rearward direction and the rightward and leftward direction. Furthermore, LEDs 52 serving as "light sources" are disposed on the undersides of the lenses 50. Hole portions (not shown in the drawings) for disposing the LEDs 52 are formed in the padding configuring the main body portion 22.

The LEDs 52 are electrically connected to the ECU 46 via the circuit board 42, and the LEDs 52 are made to emit light by the control of the ECU 46 to illuminate the touch sensor portion 26A (not shown in FIG. 7) from the back surface side. Furthermore, when the LEDs 52 illuminate the touch sensor portion 26A from the back surface side via the lenses 50, the seated occupant D can see the light leaking from the interstices between the warp threads 28A and the weft threads 28B in the touch sensor portion 26A. Additionally, the ECU 46 can be configured to make the sensing area of the touch sensor portion 26A visible to the seated occupant D by causing the LEDs 52 corresponding to the sensing area of the touch sensor portion 26A to emit light. Because of this, the seated occupant D can recognize the operating region in the touch sensor portion 26A. Consequently, operability for the seated occupant D can be improved.

Furthermore, in the present embodiment, the design portion 24UC of the arm rest cover 24 is configured by the touch sensor portion 26A and the non-operable portion 26B, but the entire design portion 24UC of the arm rest cover 24 may also be configured as the touch sensor portion 26A.

Furthermore, in the present embodiment, as described above, the ECU 46 is configured to set the sensing area of the touch sensor portion 26A in the upper cover 24U on the basis of the position detection data output from the cabin camera 48, but the ECU 46 may also be configured to not set the sensing area of the touch sensor portion 26A. That is, step 1 and step 2 in the working of the vehicle input device 40 may also be omitted, and the working of the vehicle input device 40 may also be started from step S3.

Furthermore, in the present embodiment, as described above, the ECU 46 is configured to determine in step 5 whether or not the operation (touching) of the sensing area of the touch sensor portion 26A by the seated occupant D is the predetermined operation, but step 5 may also be omitted from the working of the vehicle input device 40. That is, the ECU 46 may also be set to move to step 1 in a case where the sightline of the seated occupant D is not directed toward the navigation device 38 in step 4.

Furthermore, in the present embodiment, as described above, the ECU 46 is configured to determine in step 4 whether or not the sightline of the seated occupant D is directed toward the navigation device 38, but step 4 may also be omitted from the working of the vehicle input device 40. That is, the ECU 46 may also be configured to move to step 5 after the end of step 3.

Furthermore, in the present embodiment, the touch sensor portion 26A in the upper cover 24U is configured as a touch sensor made of cloth, but the configuration of the touch sensor portion 26A in the upper cover 24U is not limited to this. For example, the touch sensor portion may also be configured as a film touch sensor that is flexible and is relatively thin, with the touch sensor being integrally provided in the front surface of the upper cover 24U and the touch sensor portion being formed in the upper cover 24U. In this case also, the sense of incongruity imparted to the seated occupant D touching the touch sensor portion can be reduced because the touch sensor portion is formed as a film that is flexible.

Furthermore, the vehicle input device 40 of the present embodiment may also be installed in a vehicle (automobile) that is capable of driving itself. In this case, for example, the vehicle seat 10 may be rotatably coupled, with its axial direction coinciding with the vertical direction, to the vehicle body of the vehicle V in such a way that the direction the vehicle seat 10 faces can be changed. In this case, the cabin camera 48 may also be provided on the vehicle seat 10.

Furthermore, in the present embodiment, the vehicle input device 40 is applied to the arm rest 20 of the vehicle seat 10 that is a driver's seat, but the application of the vehicle input device 40 is not limited to this. For example, the vehicle input device 40 may also be applied to the arm rest 20 of the vehicle seat 10 that is the front passenger seat, and may also be applied to an arm rest of a vehicle seat that is a rear seat disposed in the rear portion of the cabin C. Furthermore, the vehicle input device 40 may also be applied to an arm rest provided in a side door of the vehicle V.

What is claimed is:

1. A vehicle input device comprising:
   a cover configured to include a touch sensor portion that is flexible and that detects operation by an occupant, the cover covering a main body portion of an arm rest that supports an arm of the occupant; and
   a control unit that outputs an operation signal to an on-board instrument on the basis of a signal detected by the touch sensor portion,
   wherein the control unit changes a range in which a position of a hand of the occupant is detected in the touch sensor portion in a vehicle forward-rearward direction on the basis of information indicating a position of the hand of the occupant placed on the touch sensor portion in the vehicle forward-rearward direction,
   when the information indicating the position of the hand indicates that the hand is located in a first position in the vehicle forward-rearward direction, the control unit sets the detection range of the touch sensor portion to a first region,
   when the information indicating the position of the hand indicates that the hand is located in a second position in the vehicle forward-rearward direction, the control unit sets the detection range of the touch sensor portion to a second region,
   the second position being located farther toward the rear then the first position in the vehicle forward-rearward direction, and
   a front end of the second region in the vehicle forward-rearward direction is located farther toward the rear than a front end of the first region in the vehicle forward-rearward direction.

2. A vehicle input device comprising:
   a cover configured to include a touch sensor portion that is flexible and that detects operation by an occupant, the cover covering a main body portion of an arm rest that supports an arm of the occupant;
   a control unit that outputs an operation signal to an on-board instrument on the basis of a signal detected by the touch sensor portion; and
   a position detection device that detects a position of a hand of the occupant,
   wherein the control unit changes a range in which a position of the hand of the occupant is detected in the touch sensor portion in a vehicle forward-rearward direction on the basis of information indicating the position of the hand of the occupant detected by the position detection device in the vehicle forward-rearward direction,
   when the information indicating the position of the hand indicates that the hand is located in a first position in the vehicle forward-rearward direction, the control unit sets the detection range of the touch sensor portion to a first region,
   when the information indicating the position of the hand indicates that the hand is located in a second position in the vehicle forward-rearward direction, the control unit sets the detection range of the touch sensor portion to a second region,
   the second position being located farther toward the rear then the first position in the vehicle forward-rearward direction, and
   a front end of the second region in the vehicle forward-rearward direction is located farther toward the rear than a front end of the first region in the vehicle forward-rearward direction.

3. The vehicle input device according to claim 2, further comprising a sightline detection device that detects a sightline of the occupant,
   wherein the control unit determines whether or not the sightline of the occupant is directed toward the on-board instrument on the basis of information detected by the sightline detection device and, when the sightline of the occupant is directed toward the on-board instrument, validates the operation of the touch sensor portion by the occupant.

4. The vehicle input device according to claim 3, wherein the sightline detection device includes a cabin camera.

5. The vehicle input device according to claim 2, wherein the control unit determines whether or not the operation of the touch sensor portion by the occupant is a predetermined operation and, when the operation is the predetermined operation, validates the operation of the touch sensor portion by the occupant.

6. The vehicle input device according to claim 2, wherein light sources are provided on a back surface side of the cover, and the touch sensor portion is illuminated as a result of the light sources emitting light so that a region of the touch sensor portion is made visible from a front surface side of the cover.

7. The vehicle input device according to claim 2, wherein the position detection device includes a cabin camera.

8. The vehicle input device according to claim 2, wherein the touch sensor portion is made of cloth.

9. The vehicle input device according to claim 2, wherein:
   the touch sensor portion includes a plurality of warp threads and a plurality of weft threads, each of the warp threads and the weft threads having conductive threads covered by a nonconductive material; and
   the warp threads extend in the forward and rearward direction and are disposed adjacent to each other in the rightward and leftward direction, and the weft threads extend in the rightward and leftward direction and are disposed adjacent to each other in the forward and rearward direction.

10. A vehicle input device comprising:
a cover configured to include a touch sensor portion that is flexible and that detects operation by an occupant, the cover covering a main body portion of an arm rest that supports an arm of the occupant;
a control unit that outputs an operation signal to an on-board instrument on a basis of a signal detected by the touch sensor portion; and
a position detection device including a cabin camera that captures an image of an upper body of the occupant, wherein
the control unit determines information indicating the position of a hand of the occupant relative to the touch sensor portion based on the image of the upper body of the occupant, and
the control unit is configured to change a range in which the position of the hand of the occupant is detected in the touch sensor portion based on the information.

11. The vehicle input device according to claim 10, further comprising a sightline detection device that detects a sightline of the occupant,
wherein the control unit determines whether or not the sightline of the occupant is directed toward the on-board instrument on the basis of information detected by the sightline detection device and, when the sightline of the occupant is directed toward the on-board instrument, validates the operation of the touch sensor portion by the occupant.

12. The vehicle input device according to claim 11, wherein the sightline detection device includes a cabin camera.

13. The vehicle input device according to claim 10, wherein the control unit determines whether or not the operation of the touch sensor portion by the occupant is a predetermined operation and, when the operation is the predetermined operation, validates the operation of the touch sensor portion by the occupant.

14. The vehicle input device according to claim 10, wherein light sources are provided on a back surface side of the cover, and the touch sensor portion is illuminated as a result of the light sources emitting light so that a region of the touch sensor portion is made visible from a front surface side of the cover.

15. The vehicle input device according to claim 10, wherein the touch sensor portion is made of cloth.

16. The vehicle input device according to claim 10, wherein:
the touch sensor portion includes a plurality of warp threads and a plurality of weft threads, each of the warp threads and the weft threads having conductive threads covered by a nonconductive material; and
the warp threads extend in the forward and rearward direction and are disposed adjacent to each other in the rightward and leftward direction, and the weft threads extend in the rightward and leftward direction and are disposed adjacent to each other in the forward and rearward direction.

* * * * *